United States Patent
Gale et al.

(10) Patent No.: US 6,418,713 B1
(45) Date of Patent: Jul. 16, 2002

(54) METHOD FOR GENERATING ADDITIONAL ENGINE LOADS DURING START-UP

(75) Inventors: Allan Roy Gale, Livonia; Eric Warren Curtis, Milan; Nizar Trigui, Ann Arbor; Rodney John Tabaczynski, Northville; Stephen George Russ; Wengang Dai, both of Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/732,854

(22) Filed: Dec. 8, 2000

(51) Int. Cl.[7] .................................................. F01N 3/00
(52) U.S. Cl. ............................ 60/284; 60/274; 60/285; 60/286; 123/179.3
(58) Field of Search ...................... 60/684, 274, 285, 60/286, 300; 123/179.3, 179.5

(56) References Cited

U.S. PATENT DOCUMENTS

| | | | | |
|---|---|---|---|---|
| 5,503,804 A | * | 4/1996 | Fujishita et al. | 60/284 |
| 5,836,151 A | * | 11/1998 | Atanasyan et al. | 60/274 |
| 5,881,552 A | * | 3/1999 | Iwata et al. | 60/284 |
| 5,947,080 A | * | 9/1999 | Weissman et al. | 123/300 |
| 5,950,419 A | * | 9/1999 | Nishimura et al. | 60/274 |
| 6,003,304 A | * | 12/1999 | Swanson et al. | 60/274 |
| 6,082,352 A | * | 7/2000 | Digeser et al. | 123/299 |

* cited by examiner

Primary Examiner—Thomas Denion
Assistant Examiner—Binh Tran
(74) Attorney, Agent, or Firm—Allan J. Lippa

(57) ABSTRACT

A method and system for generating auxiliary load during start-up and warm-up of a spark ignition engine operating with a high load, cold start and spark retard and enleanment (HL-CSSRE) methodology to achieve rapid light-off. The method and system of the present invention uses existing vehicle systems (20) to couple an auxiliary load to the engine for a predetermined period of time during engine start-up and warm-up.

15 Claims, 2 Drawing Sheets

METHOD FOR GENERATING ADDITIONAL ENGINE LOADS DURING START-UP

TECHNICAL FIELD

The present invention relates generally to controlling the exhaust temperature of spark ignition engines operating with a cold start and spark retard and enleanment methodology and more particularly, to a method for generating additional engine load using existing vehicle systems during periods of engine cold-start and warm-up.

BACKGROUND OF THE INVENTION

Stringent standards have been placed on emissions for internal combustion engines for cars, trucks and other vehicles to control the amount of hydrocarbons (HC), carbon monoxide (CO), and nitrogen oxides ($NO_x$) that are released into the atmosphere. However, increasingly more stringent emissions standards are being placed on vehicles, and still further emissions reductions for engine operation are being implemented.

A considerable amount of total emissions occur during engine warm-up. During this time period, the emissions-reducing catalysts located in the catalytic converters are largely ineffective due to the fact that they have not reached a temperature at which significant catalytic activity can be maintained, also known as light-off. Thus attempts have been made to decrease emissions during engine warm-up by decreasing the time it takes to raise the exhaust temperature to light-off.

Cold start spark retard and enleanment (CSSRE) is a process used to decrease cold-start emissions. With CSSRE, hydrocarbons are oxidized prior to exiting the exhaust system and the catalyst is rapidly heated by high exhaust temperatures. During a cold start with CSSRE, engines operate at 1200 RPM, 1 bar brake mean effective pressure (BMEP), slightly lean air/fuel ratios and heavily retarded spark timing. While CSSRE enables engines to meet stringent emissions standards, it subjects the engine to extremely retarded spark timing and lean operating conditions, thereby increasing cycle-to-cycle variations, which adversely affects the engine's stability and increases the requirements for the fuel delivery systems and engine controls for air/fuel mixtures and spark timing.

There is a need for fast and robust catalyst light-off during engine cold-start and warm-up periods in order to speed-up catalyst light-off and meet stringent emissions standards. Therefore there is a need for improved CSSRE methods that improve engine performance and reduce emissions.

SUMMARY OF THE INVENTION

It is an object of the present invention to introduce an auxiliary load on an engine operating with CSSRE during periods of engine idle to produce higher exhaust gas temperatures for rapid catalyst light-off.

In carrying out the above objects and other objects and features of the present invention, a system and method is provided for increasing the load of an engine during idle conditions in order to speed-up catalyst light-off for a high load cold start and spark retard and enleanment methodology. The engine is operating with a CSSRE method.

It is preferred to operate the engine while additional auxiliary loads are placed on it. According to the present invention, additional loads are generated by existing systems on the vehicle. For example, in one embodiment a compressor generates the additional loads in the air-conditioning system. In the alternative, the additional loads may be generated by a starter/alternator. The present invention is advantageous in that it provides a high-load CSSRE method, which functions without additional hardware components, complexity or cost. The present invention requires some software changes in order to control an electronic engine control module.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Cold start spark retard and enleanment (CSSRE) is a process used to decrease cold-start emissions. An engine operating at stoichiometry does not rapidly heat the catalyst and therefore more emissions are generated. With CSSRE, hydrocarbons are oxidized prior to exiting the exhaust system and the catalyst is more rapidly heated by high exhaust temperatures. During a cold start with CSSRE engines operate at approximately 1200 RPM, 1 bar brake mean effective pressure (BMEP), slightly lean air/fuel ratios and heavily retarded spark timing. Idle speed may also be changed in the CSSRE method. However, due to the extremely retarded spark timing and lean operating conditions, CSSRE causes increased cycle-to-cycle variations and increases the requirements for the fuel delivery systems and engine controls for air/fuel mixtures and spark timing.

Figure 1:
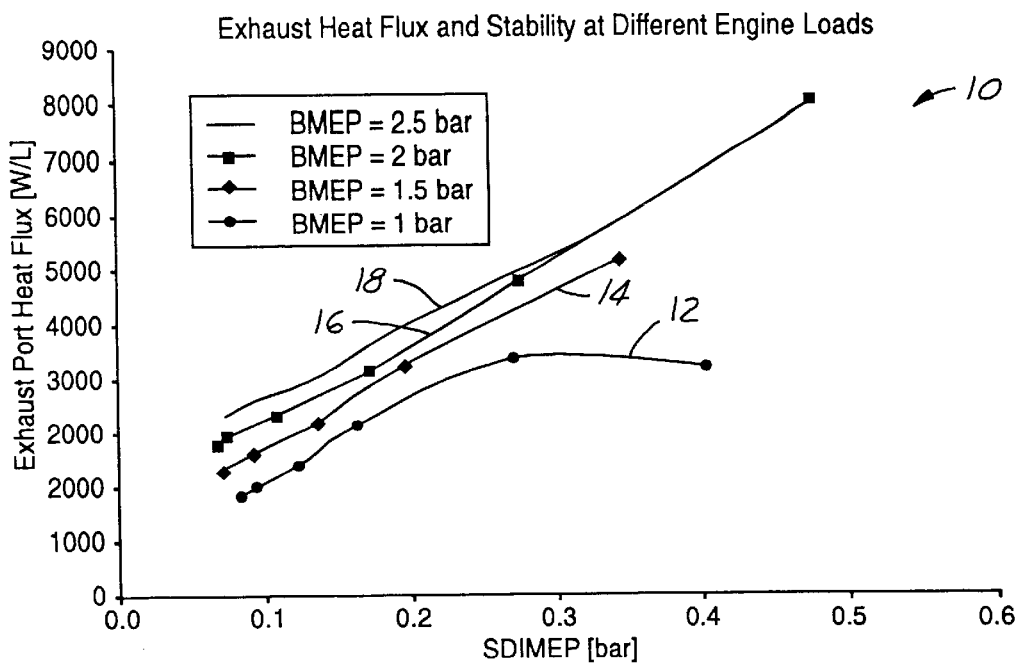
FIG. 1 is a graph depicting the engine stability and exhaust port heat flux for various engine loads.

FIG. 1 illustrates the relationship 10 between the exhaust port heat flux and engine stability for various engine loads. It is clear that as the engine load increases from one bar 12, to one and one-half bars 14, to two bars 16 and two and a half bars 18, the exhaust port temperature rises at a faster rate.

Through testing and simulation it has been discovered that operating spark ignition engines at high loads speeds up catalyst light-off. Operating a spark ignition engine at high loads with CSSRE raises the manifold pressure, which reduces residual gas in the cylinder and increases the burn rate. As a result, the engine's operation is more stable and the exhaust heat flux is drastically increased (as shown in FIG. 1) due to higher exhaust temperatures and higher mass flow rates.

Testing has shown that typical conditions for operating a spark ignition engine with CSSRE according to the present invention are to operate the engine at 1200 RPM, 2 bar BMEP, an air/fuel ratio of 15 with moderately retarded spark timing during cold-start and warm-up. This operation dramatically speeds up catalyst light-off. The duration of high load CSSRE is less than thirty seconds, and typically on the order of twenty seconds. In order to operate the engine at 2 bar BMEP under idle conditions, additional loads need to be placed on the engine for a predetermined amount of time. The additional loads can be mechanical, such as an air-conditioner compressor, or electrical, such as a starter/alternator.

An engine system incorporating high load CSSRE according to the present invention allows the use of CSSRE without extraordinary requirements on the fuel preparation, combustion and control systems. The engine's operation is improved due to lower cyclic variations. Higher exhaust temperatures and exhaust gas energy are obtained for enhanced post-combustion HC oxidation and faster catalyst light-off. Further, as shown in FIG. 1, the exhaust heat flux is increased with the same levels of engine cyclic variations as a regular CSSRE.

According to the present invention the electronic engine control (EEC) module has a modified control strategy in which an existing vehicle system, such as an air-conditioner compressor or a starter/alternator, is activated for a predetermined amount of time during high load CSSRE. The air/fuel ratio is leaned and the spark timing is retarded as in conventional CSSRE processes. The system generates enough auxiliary load during this predetermined amount of time, which is typically twenty seconds, to operate the engine at the desired operating conditions and thereby speed up catalyst light-off. Further, a system is used for generating the auxiliary load that is already present on the vehicle, i.e. compressor or starter/alternator, to generate the additional load does not add cost to the vehicle.

Figure 2:
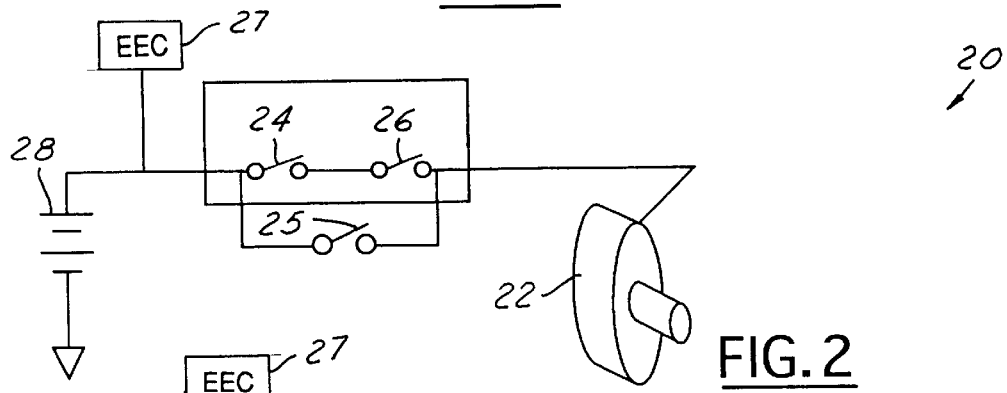
FIG. 2 is a diagram of one embodiment of the system of the present invention which generates additional loads using an air-conditioning compressor.

FIG. 2 is a diagram of an air-conditioning system 20 including a compressor 22 which is typically controlled by two switches 24, 26 and is connected in series with a battery 28. The compressor 22 is activated when both the air conditioning activation switch 24 and the temperature control switch 26 are activated. Typically, the switches 24 and 26 are controlled by the EEC and a climate control system (not shown). During start-up, both switches 24 and 26 can be automatically closed to turn on the air-conditioner compressor 22 for a predetermined amount of time during engine start-up and warm-up thereby generating additional load to the engine. The compressor provides the additional load to the engine (not shown) necessary to speed-up catalyst light-off.

It is also possible, in an alternative embodiment also shown in FIG. 2, to have a separate switch 25 dedicated to engine start-up that is closed during start-up to activate the compressor. Switch 25 is activated by an EEC unit 27 during start-up in place of the two switches 24 and 26 as described above.

Figure 3:
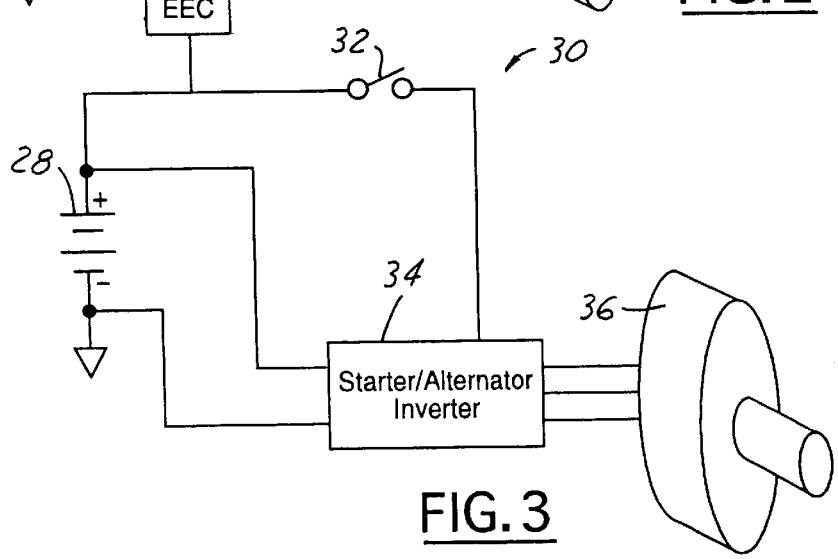
FIG. 3 is a diagram of another embodiment of the system of the present invention, which generates additional loads using a starter/alternator.
Figure 4:
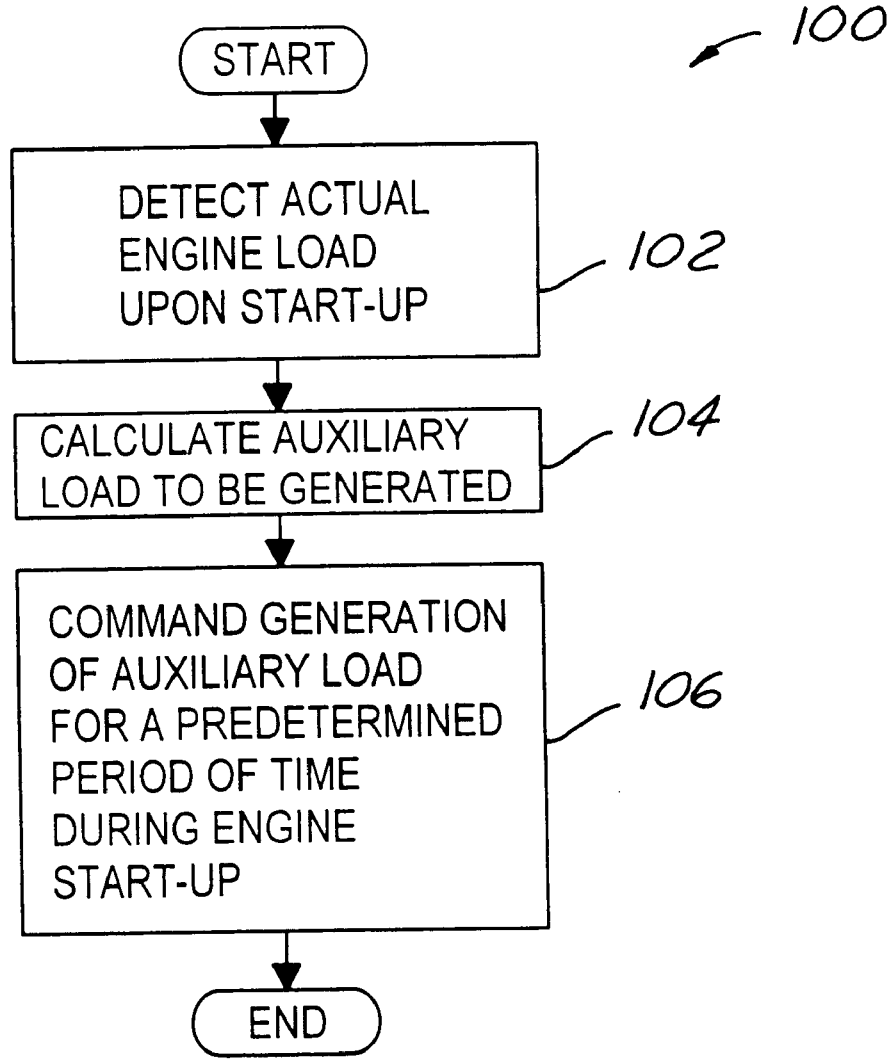
FIG. 4 is a flowchart of the high load CSSRE method of the present invention.

Another embodiment 30 is shown in FIG. 3, where a starter/alternator 36 is used to generate the additional load. A load control switch 32 is located between the battery 28 and a starter/alternator inverter 34. During start-up of the engine, the load control switch 32 is activated, typically upon command from the EEC 27, sending a command 35 to a starter/alternator inverter 34 to overexcite the starter/alternator 36, thereby generating additional load to the engine (not shown).

FIG. 2 is a diagram of an engine 21 having an exhaust manifold 23 and a catalytic converter 25 in conjunction with an air conditioning system 20 including a compressor 22 which is typically controlled by two switches 24, 26 and is connected in series with a battery 28. The compressor 22 is activated when both the air conditioning activation switch 24 and the temperature control switch 26 are activated. Typically, the switches 24 and 26 are controlled by the EEC and a climate control system (not shown). During start-up, both switches 24 and 26 can be automatically closed to turn on the air-conditioner compressor 22 for a predetermined amount of time during engine start-up and warm-up hereby generating additional load to the engine 21. The compressor provides the additional load to the engine 21 necessary to speed-up catalyst light-off.

The invention covers all alternatives, modifications, and equivalents, as may be included within the spirit and scope of the appended claims.

What is claimed is:

1. A method of operating an engine at high loads during start-up and warm-up conditions to achieve rapid catalyst light-off, the engine having a cold start spark retard and enleanment methodology and a predetermined load upon start-up, said method comprising the steps of:

detecting an actual engine load during start-up;

determining an auxiliary load to be generated to raise said actual engine load to said predetermined load; and coupling an auxiliary load to the engine for a predetermined period of time during engine start up and warm-up;

whereby said auxiliary load on the engine is additive to the actual engine load achieving the predetermined load during start-up for rapid catalyst light-off.

2. The method as claimed in claim 1 wherein said step of coupling an auxiliary load to the engine further comprises coupling an auxiliary load to the engine to operate the engine at approximately 1200 RPM, 2 bar brake mean effective pressure, and an air/fuel ratio of 15.

3. The method as claimed in claim 1 further comprising an air conditioner compressor and said step of coupling an auxiliary load further comprises the step of activating the compressor for the predetermined period of time during engine start up.

4. The method as claimed in claim 1 further comprising a starter/alternator and said step of coupling an auxiliary load further comprises the step of over exciting the starter/alternator during engine start-up.

5. A system for achieving rapid light-off in a catalytic converter operating in conjunction with a spark ignition engine having a cold start and spark retard and enleanment methodology, said system comprising:

an existing vehicle system for generating an auxiliary engine load; and a controller for monitoring an engine load and coupling said auxiliary engine load to said engine for a predetermined period of time during engine start up when said engine load is less than a predetermined load to achieve at least said predetermined load for rapid catalyst light-off.

6. The system as claimed in claim 5 wherein said existing vehicle system for generating an auxiliary load further comprises an air conditioning compressor.

7. The system as claimed in claim 6 wherein said air conditioning compressor generates a load whereby the engine operates at approximately 1200 RPM, 2 bar brake mean effective pressure, an air/fuel ratio of 15 with moderately retarded spark timing for a predetermined period of time.

8. The system as claimed in claim 7 wherein said predetermined period of time is on the order of twenty seconds.

9. The system as claimed in claim 5 wherein said existing vehicle system for generating an auxiliary load further comprises a starter/alternator.

10. The system as claimed in claim 9 wherein said starter/alternator generates a load whereby the engine operates at approximately 1200 RPM, 2 bar brake mean effective pressure, an air/fuel ratio of 15 with moderately retarded spark timing for a predetermined period of time.

11. The system as claimed in claim 10 wherein said predetermined period of time is on the order of twenty seconds.

12. A method of operating an engine having a predetermined load comprising the steps of:

initiating the operation of the engine during a cold start under a cold start spark retard enleanment process by leaning an air/fuel ratio to the engine and retarding a spark timing of the engine;

detecting an actual engine load during start-up;

determining an auxiliary load to be generated to raise the actual engine load to the predetermined load; and coupling an auxiliary load to the engine for a predetermined period of time during the cold start;

whereby the auxiliary load on the engine is additive to the actual engine load achieving the predetermined load during cold start for rapid catalyst light-off.

13. The method as claimed in claim 12 further comprising an air conditioner compressor in operable association with said engine and said step of coupling said auxiliary load to the engine further comprises the step of activating said air conditioner compressor for said predetermined period of time during engine start-up.

14. The method as claimed in claim 12 further comprising a starter/alternator in operable association with said engine and said step of coupling said auxiliary load to the engine further comprises the step of activating said starter/alternator for said predetermined period of time during engine start-up.

15. The method as claimed in claim 12 wherein said step of coupling an auxiliary load to the engine further comprises coupling an auxiliary load to the engine to operate the engine at approximately 1200 RPM, 2 bar brake mean effective pressure, and an air/fuel ratio of 15.

* * * * *